W. C. SKEELS.
JOURNAL BOX.
APPLICATION FILED MAY 28, 1921.

1,420,156.

Patented June 20, 1922.

WITNESSES
Geo. S. Brock
W. A. Williams

INVENTOR
W. C. Skeels.
BY
ATTORNEYS

UNITED STATES PATENT OFFICE.

WILLIAM C. SKEELS, OF OKLAHOMA, OKLAHOMA.

JOURNAL BOX.

1,420,156.  Specification of Letters Patent.  Patented June 20, 1922.

Application filed May 28, 1921. Serial No. 473,508.

*To all whom it may concern:*

Be it known that I, WILLIAM C. SKEELS, a citizen of the United States, and a resident of Oklahoma city, in the county of Oklahoma and State of Oklahoma, have made certain new and useful Improvements in Journal Boxes, of which the following is a specification.

This invention relates to certain improvements in journal boxes and has reference more particularly to devices of this general character in which ball bearings are used to reduce friction consequent to the rotation of an axle thimble in the axle box.

An object of this invention is to provide a novel and improved journal box especially adapted for use in connection with a vehicle wheel and one wherein such journal box may be readily applied within the hub of the wheel and effectively held therein.

Another object of the invention is to provide a novel and improved device of the character set forth wherein end play or thrust is substantially eliminated and wherein the use of a cone bearing will be unnecessary.

With the above mentioned and other objects in view, the invention consists in certain novel features of construction, arrangement and combination of parts, as will be hereinafter fully described and pointed out in the claims, reference being had to the drawing forming a part hereof in which:—

Figure 1:
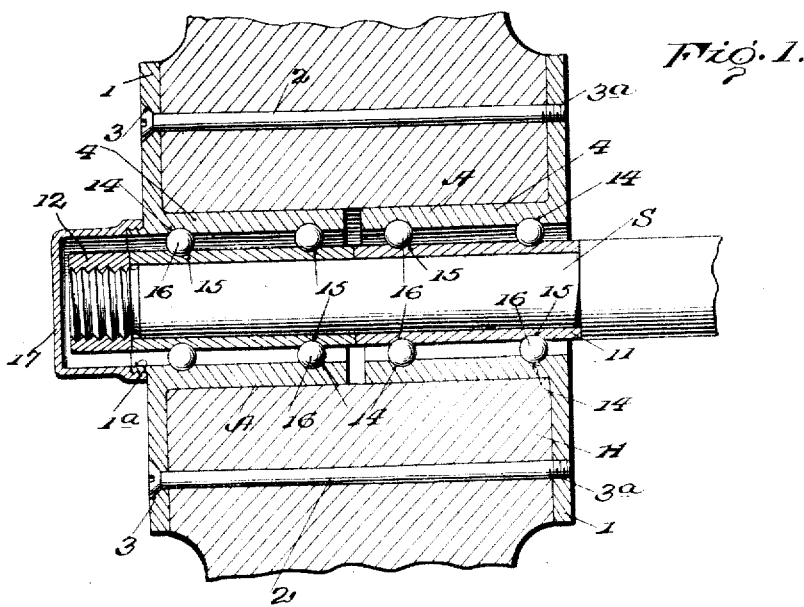
Figure 1 is a view partly in elevation and partly in section with the parts as applied in use.
Figure 2:
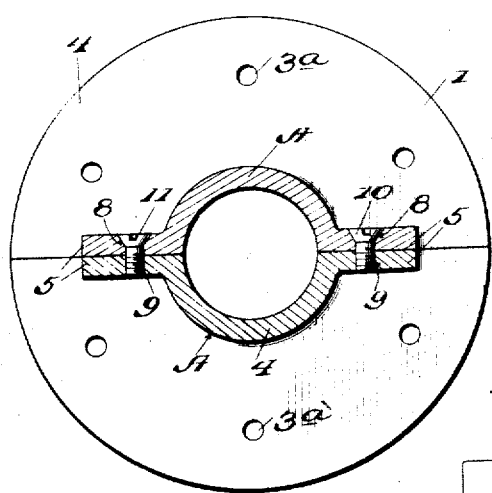
Figure 2 is a transverse section taken through one of the members of the journal box.
Figure 3:
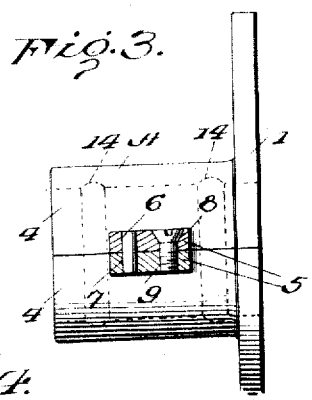
Figure 3 is a side elevation of the part illustrated in Fig. 2, with the ears in section.

As herein disclosed the journal box comprises two sections A adapted to be inserted within the hub H of a wheel and through the opposite ends thereof, the outer end of each of the sections A being provided with a vertical annular flange 1, of such width as to overlie the adjacent end of the hub. These flanges 1 have coacting therewith the retaining bolts 2 which are also passed through the body of the hub H. In the present instance the bolts 2 pass loosely through openings 3 formed in one of the flanges and are then threaded or screwed into the openings 3ª formed in the flanges of the separated sections A. Each of sections A is split longitudinally on a radial line whereby said sections comprise two members designated as 4. The longitudinal margins of the members 4 are provided substantially midway thereof with the horizontally extending ears 5 so positioned as to overlie each other when the parts are in properly assembled position. The ears 5 of one section are provided with the projecting pins 6, adapted to snugly fit in the openings 7 produced in the abutting ear 5 of the other member.

The ears 5 of the two members are also provided with registering openings 8 and 9 respectively, said openings aligning longitudinally with the pins 6 and openings 7 above referred to, the openings 9 being threaded.

Loosely disposed through the openings 8 and engaging in threaded relation with the openings 9 are the stud screws 10 which serve to maintain or hold the members 4 of each of the sections A when in assembled relation, and yet permit a relative adjustment thereof, as will be more fully set forth hereinafter.

Disposed axially of each of the sections A is a sleeve or skein 11 and when the device is in properly assembled condition the inner end of the sleeve or skein 11 of one section, will be in contact with the inner end of the sleeve or skein of the other section.

A spindle S is passed through sleeve or skein 11, and coacting with the other end of the spindle is a nut 12 screwed thereon which engages the outer end of the sleeve or skein of that section of A by which the device is held upon the spindle.

Each section of A adjacent its opposite ends, is provided with an annular groove or raceway 14 concentric with the similar annular grooves or raceways 15 formed in the periphery of the coacting sleeve or skein 11. Seated within these concentric raceways, which are by the way, substantially complementary to each other, are the anti-friction balls 16.

To additionally retain and hold the parts in place and also prevent entrance of dust or grit to the bearings, I provide a cap 17 internally threaded at its open end which engages a horizontal threaded collar 1ª projecting outwardly from the outer flange 1.

The pins 6 in practice, where this form of boxing is used, are of decided importance as they serve to maintain the members 4 of the sections A in place while the screws 10 are being applied; these pins 6 also serve to hold the members 4 in assembled relation in the event that the screws 10 are removed to permit separation of the members to permit inspection of the bearings 16.

Should it become necessary to replace a ball which may have become flattened or otherwise unfit for use, the sections 4, after the screws 10 have been removed, may be sufficiently separated to permit removal of the unfit ball, yet at the same time these pins 6 will hold the members 4 against slipping back and forth, and retain their proper relative position so that the screws 10 may be again inserted after the perfect ball bearing has been substituted for the ones removed.

Figure 4:
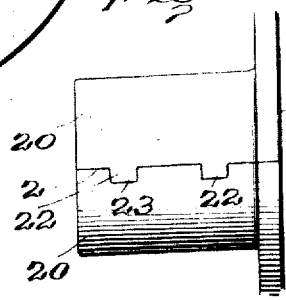
Figure 4 is a view of a slightly modified form of device showing another method of securing the members together to prevent longitudinal movement thereof.

In Figure 4 is illustrated a modification by which this slipping back and forth of the sections may be prevented. In this form of device the sections 20 do not carry the lugs 5, but instead the meeting edges 21 are provided with tongues and grooves 22 and 23 respectively, so that the edges of the sections are interlocked.

From the above it will be noted that my improvement embodies a structure wherein end play is substantially eliminated, and in which rotation may be effected with a minimum of frictional resistance, and that the use of a cone or kindred element is entirely unnecessary.

Having thus fully described my invention, and having set forth an embodiment by which it may be carried into effect, what I claim and desire to secure by Letters Patent is:—

1. A device as herein characterized and comprising a cylindrical box insertable within the hub of a wheel, said box divided longitudinally to form two separable sections, and means integrally associated with the abutting longitudinal edges of the sections to connect the sections and also to prevent longitudinal relative movement of the sections.

2. A device as herein characterized, comprising a box insertable within the hub of a wheel and divided longitudinally to form two separable sections, means carried by the abutting longitudinal edges of the sections to prevent relative longitudinal movement of said sections either when in intimate relation, or when partially separated to allow access to the bearings.

3. A device as herein characterized and comprising a journal box insertable within the hub of a wheel and divided longitudinally to form similar separable sections, the longitudinal abutting edges of said sections having radially projecting lugs or ears, the ears of one section overlying and abutting the corresponding ears of the other section, means coacting with said ears or lugs for separably connecting the sections, one to the other, an axle skein disposed axially within said box, other means associated with said ears to permit partial separation of the sections and still prevent relative longitudinal movement thereof, the opposed concentric walls of the box and skein provided with concentric and aligned race grooves, and antifriction roller members seated within said grooves.

4. A device as herein characterized comprising a box member insertable within the hub of a wheel and divided longitudinally to form two separable sections, the longitudinal edges of said sections having outwardly extending ears, the ears of one section overlying the corresponding ears of the other section, removable clamping members coacting with the respective ears for connecting the sections one to the other, a sleeve or skein disposed axially through the said box, the opposing walls of the box and skein having concentric and aligned annular grooves, antifriction members seated in said grooves, certain of said ears having openings, others of said ears provided with pins, said pins fitting within said openings to permit partial separation of the sections and still prevent relative longitudinal movement thereof.

5. In combination with the hub of a wheel, a journal box comprising two sections inserted in said hub at its inner and outer ends, the outer ends of the sections being provided with vertical flanges overlying the inner and outer ends of the hub, tie rods passing through said flanges and the hub to hold the sections in position, a skein or sleeve disposed axially within each of said sections, said sleeves and sections having opposed concentric ball races, antifriction balls mounted in said races, each of said sections separated longitudinally to form relatively movable members, and means for connecting said members to permit relative radial adjustment thereof.

6. A device as herein characterized, comprising cylindrical box insertable within the hub of a wheel, said box divided longitudinally to form mating sections, the abutting longitudinal edges of said sections connected in interlocked relation to prevent relative longitudinal movement thereof.

WILLIAM C. SKEELS.